United States Patent [19]

Beleck

[11] Patent Number: 5,935,655
[45] Date of Patent: *Aug. 10, 1999

[54] THERMALLY RELEASABLE BARRIER COATING, COMPOSITION THEREFOR, AND USE THEREOF

[75] Inventor: Scott J. Beleck, St. Clair Shores, Mich.

[73] Assignee: Henkel Corporation

[ * ] Notice: This patent issued on a continued prosecution application filed under 37 CFR 1.53(d), and is subject to the twenty year patent term provisions of 35 U.S.C. 154(a)(2).

[21] Appl. No.: 08/591,992

[22] Filed: Jan. 26, 1996

[51] Int. Cl.$^6$ .................................................. B05D 3/02
[52] U.S. Cl. .................. 427/380; 427/385.5; 427/388.4; 524/44; 524/55; 524/425; 524/442; 524/446; 524/451; 524/493; 524/502; 524/521
[58] Field of Search ..................................... 524/425, 446, 524/451, 44, 55, 442, 493, 502, 521; 427/380, 385.5, 388.4

[56] References Cited

U.S. PATENT DOCUMENTS

| | | | |
|---|---|---|---|
| 4,464,416 | 8/1984 | Liepins | 427/40 |
| 4,844,833 | 7/1989 | Komatsu et al. | 252/174.13 |
| 4,867,900 | 9/1989 | Komatsu et al. | 252/174.23 |
| 5,010,131 | 4/1991 | Wagner | 524/457 |
| 5,017,303 | 5/1991 | Komatsu et al. | 252/174.13 |
| 5,522,717 | 6/1996 | Matsumoto et al. | 425/84 |

FOREIGN PATENT DOCUMENTS 0574247  12/1993  European Pat. Off. .

*Primary Examiner*—Judy M. Reddick
*Attorney, Agent, or Firm*—Ernest G. Szoke; Wayne C. Jaeschke; Norvell E. Wisdom, Jr.

[57] ABSTRACT

A combination of (A) a nitrogen containing water soluble polymer, (B) a water insoluble film forming polymer, and (C) gas filled, polymer walled microballoons provides a superior thermally releasable coating that (i) can be conveniently and reliably coated from a water based solution and dispersion onto surfaces to be protected against painting, (ii) is reliably stable at ambient temperatures, (iii) even after being coated with many times its own thickness of accumulated paint particles, rapidly disintegrates, along with the accumulated paint coating formed on it, upon contact with hot water, into particles of a size that readily escapes from standard paint booth grate structures, (iv) detackifies any paint particles that escape during distintegration of the combined thermally releasable coating and paint residues accumulated thereon, and (v) disintegrates into particles that float on water, so that they can be readily removed from the grates by immersing the latter in hot water, allowing a few minutes for the disintegration to take effect, and then skimming off the floating solids on the surface of the water.

20 Claims, No Drawings

THERMALLY RELEASABLE BARRIER COATING, COMPOSITION THEREFOR, AND USE THEREOF

BACKGROUND OF THE INVENTION

1. Field of the Invention

This invention relates to an improved composition and method for providing a thermally releasable barrier coating for surfaces not intended to be painted but on which paint[1] nevertheless accumulates in practice because of the proximity of the surfaces not intended to be painted to other surfaces that are intended to be painted. The invention is more particularly applicable for coating the floor grates in paint spray booths or cabinets, such as are extensively used in manufacturing automobiles and many other objects that are decorated by painting.

2. Discussion of Related Art

Numerous barrier coatings have been used in the prior art. Most have been removed when necessary by solvents, use of high pressure and/or high temperature water, mechanical means, or the like, all of which to greater or lesser degrees are labor intensive, require substantial volumes of at least moderately expensive materials, or both. More recently, thermally removable barrier coatings have become known in the art.

Most of those so far known utilize a combination of carbonate and/or acid carbonate salts

[1] Throughout this description, unless the context requires to the contrary, as where a specific material is named, the term "paint" is to be understood as encompassing all similar terms such as enamel, lacquer, shellac, varnish, and the like. with an acidic material that is prevented from coming into contact with the carbonate even when mixed with it at normal ambient temperatures, but that is brought into contact by some mechanical and/or chemical means when the temperature of the solid containing both components is raised, most often by contact with hot water and/or steam. The resulting reaction between acid and carbonate generates carbon dioxide gas that causes the coating to rupture and in principle to fall off the coated surface, or at least to become removable by light mechanical action.

These thermally removable barrier coatings have diminished the labor and/or material costs compared with those of previous methods of removing protective barrier coatings, but in practice have been found to have certain difficulties: Complete removal is sometimes not reliably achieved; the paint accumulated on the barrier coating surface often becomes detached during the removal process, so that it can redeposit on the surface intended to be protected from being coated with it; pieces of the coating after release can all too readily become trapped in the structure having the surface to be protected from paint, particularly when this structure has relatively narrow spacings between solid elements, as is true in the grates conventionally used in paint spray booths; and the internal barrier materials that prevent contact between carbonate ions and acid materials at ambient temperatures can become unstable or otherwise suffer faults that cause premature removal and/or unreliable or incomplete removal when desired.

DESCRIPTION OF THE INVENTION

Objects of the Invention

A major object of the invention is to provide a new type of thermally releasable barrier coating that will overcome or at least ameliorate some or all of the problems with prior art thermally releasable barrier coatings as described above. Other objects will be apparent from the description below.

General Principles of Description

Except in the claims and the specific examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated or necessarily implied by the context to the contrary: percent, "parts of", and ratio values are by weight; the term "polymer" includes "oligomer", "copolymer", "terpolymer", and the like; the first definition or description of the meaning of a word, phrase, acronym, abbreviation or the like applies to all subsequent uses of the same word, phrase, acronym, abbreviation or the like and applies, mutatis mutandis, to normal grammatical variations thereof; the description of a group or class of materials as suitable or preferred for a given purpose in connection with the invention implies that mixtures of any two or more of the members of the group or class are equally suitable or preferred; specifications in chemical terms of materials in compositions refers to the materials at the time of addition to any composition so specified, and does not necessarily exclude the possibility of reaction between such materials with other materials already present in the composition at the time of addition of the specified materials; specification of materials in ionic form implies the presence of sufficient counterions to produce electrical neutrality for the composition as a whole; and any counterions thus implicitly specified preferably are selected from among other constituents explicitly specified in ionic form, to the extent possible; otherwise such counterions may be freely selected, except for avoiding counterions that act adversely to the objects of the invention.

SUMMARY OF THE INVENTION

It has been discovered that a combination of (A) a nitrogen containing water soluble polymer, (B) a water insoluble film forming polymer, and (C) gas filled, polymer walled microballoons provides a superior thermally releasable coating that, at least in its most preferred embodiments, (i) can be conveniently and reliably coated from a water based solution and dispersion onto surfaces to be protected against painting, (ii) is reliably stable at ambient temperatures, (iii) even after being coated with many times its own thickness of accumulated paint particles, rapidly disintegrates, along with the accumulated paint coating formed on it, upon contact with hot water, into particles small enough that they readily escape from standard paint booth grate structures, (iv) normally detackifies any initially tacky paint particles that might escape during distintegration of the combined thermally releasable coating and paint residues accumulated thereon, and (v) disintegrates into particles that float on water, so that they can be readily removed from the grates by immersing the latter in hot water, allowing a few minutes for the disintegration to take effect, and then skimming of the floating solids on the surface of the water.

A polymer is defined as "film forming" for the purposes of this description if, when a solution or suspension of the polymer in water is dried at a temperature of at least 25° C. from a liquid film thickness not greater than 1 millimeter, a continuous and coherent film that is solid at 25° C. is produced.

One major embodiment of the invention is a suitable liquid coating composition for applying a thermally releasable barrier coating, the liquid coating composition comprising, preferably consisting essentially of, or more preferably consisting of, water and:

(A) a component of water soluble polymer material that (i) is solid at 25° C., (ii) contains at least, with increasing preference in the order given, 1, 2, 4, 7, 10, 13, 15, 17, or 18.0 percent of nitrogen atoms bonded into a chemical moiety selected from the group consisting of amido and quaternary ammonium moieties, and (iii) is soluble in water to an extent of at least 5% at 25° C. and normal atmospheric pressure;

(B) a component of film forming polymer that is not soluble in water to an extent of as much as 4.5% at 25° C. and normal atmospheric pressure but is stably dispersed in the coating composition; and;

(C) a component of gas filled, polymer walled microballoons having the properties that (i) they are stably dispersed in the coating composition and remain stably dispersed and substantially unexpanded when the coating composition is maintained at a temperature not greater than 65° C.; and (ii) when exposed for at least five minutes to at least one temperature in the range from 80 to 95° C., they undergo an irreversible expansion, without wall rupture, so as to produce an expanded form which has a density not greater than 0.5 times their density before having expanded; and, optionally, one or more of the following components:

(D) a component of viscosity modifying agent(s) that are not part of any of the previously recited components;

(E) a component of solid filler that is not part of any of the previously recited components;

(F) a component of dispersing agent that is not part of any of the previously recited components;

(G) a component of pH adjusting agent and/or corrosion inhibitor that is not part of any of the previously recited components;

(H) a component of coloring agent that is not part of any of the previously recited components; and (J) a component of biocide that is not part of any of the previously recited components, said liquid coating composition having the properties that it can be formed into a liquid coating over a solid substrate surface and that the thus-formed liquid coating can be converted, by heating the liquid film in place on the substrate to a temperature not greater than 65° C. under normal atmospheric pressure for a time not greater than one hour, into a coherent continuous solid coating that adheres to the substrate.

Another embodiment of the invention is a process comprising, preferably consisting essentially of, or more preferably consisting of, the steps of:

(I) forming on a substrate surface to be protected against accumulation of paint thereon a liquid coating of a liquid coating composition according to the invention as described above, said liquid coating having a thickness corresponding to at least a thickness of 12 micrometers (hereinafter usually abbreviated as "$\mu$m") of constituents of the liquid coating composition that remain present after the liquid coating is heated to 65° C. for at least one hour; and (II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating; and, optionally, one or more of the following steps:

(III) causing the accumulation of paint residues on the solid coating formed in step (II) so as to form a soiled surface;

(IV) immersing the soiled surface formed in step (III) in a volume of water at a temperature at least high enough to cause irreversible expansion of the gas filled, polymer walled microballoons in the coating formed in step (II); and (V) skimming from the top surface of the volume of water in which the soiled surface was immersed in step (IV) any floating solid particles formed by disintegration in step (IV) of the coating formed in step (II), as a consequence of the irreversible expansion of the gas filled, polymer walled microballoon constituents thereof.

Other embodiments of the invention include coated substrates prepared by a process according to the invention as described above, the use of such coated substrates as grates in paint spray booths, and the like.

DETAILED DESCRIPTION OF THE INVENTION, INCLUDING PREFERRED EMBODIMENTS

One of the important functions of component (A) as identified above is to provide detackifying activity for paint residues. Component (A) is preferably selected from polymers of amide(s) of unsaturated carboxylic acids, more preferably of acrylic or methacrylic acid, still more preferably of polyacrylamide only. The concentration of component (A) in a working composition according to the invention preferably is at least, with increasing preference in the order given, 1.0, 2.0, 3.0, 3.5, 4.0, 4.5, 4.8, 5.2, 5.5, 5.8, or 6.0% and independently preferably is not more than 30, 25, 20, 15, 10, 9.0, 8.5, 8.0, 7.5, 7.3, 7.1, 6.9, 6.7, 6.5, 6.3, or 6.2%.

Component (B) may be selected from a wide variety of water insoluble polymers, preferably, primarily for reasons of economy, those commercially available in the form of dispersions or latexes. An especially preferred polymer type is copolymers of (i) vinyl esters of carboxylic acids with not more than four carbon atoms per acid molecule, most preferably vinyl acetate and (ii) at least one of the group consisting of acrylic and methacrylic acids and esters of acrylic and methacrylic acids, with esters being preferred and esters formed with alcohols containing not more than four carbon atoms still more preferred. Independently of its chemical composition, the concentration of component (B) in a working composition according to the invention preferably is at least, with increasing preference in the order given, 1.0, 2.0, 3.0, 3.5, 4.0, 4.5, 4.9, 5.3, 5.7, 6.1, 6.3, 6.5, or 6.6% and independently preferably is not more than 30, 25, 20, 15, 10, 9.0, 8.5, 8.0, 7.5, 7.3, 7.1, 6.9, or 6.8%.

For both components (A) and (B), smaller concentrations than those noted as preferred generally result in a need for multiple coating steps and/or high concentrations of viscosity increasing agents, which are relatively expensive compared with most other components of a composition according to the invention, in order to achieve a desirable final film thickness after drying, while higher concentrations than those noted above as preferred are likely to result in a coating thickness in a single pass that is higher than necessary to accomplish the purpose of the invention and therefore are uneconomical. Excessively thick coatings also might unduly reduce the space available between the elements of a grate to be coated, thereby frustrating its intended permeability to liquids. Furthermore, high concentrations of component (A) substantially increase the viscosity of an aqueous mixture containing them, thereby aggravating a tendency to excessively thick coatings.

In order to achive highly desirable properties in the films formed, it is preferred that the ratio, in a composition according to the invention, of component (B) to component (A), which are the two principal binder constituents of the composition, should be at least, with increasing preference in the order given, 0.30:1.0, 0.40:1.0, 0.50:1.0, 0.60:1.0, 0.70:1.0, 0.80:1.0, 0.90:1.0, 0.95:1.0, 1.00:1.0, 1.05:1.0, or 1.09:1.0 and independently preferably should be no more than, with increasing preference in the order given, 4.0:1.0, 3.5:1.0, 3.0:1.0, 2.5:1.0, 2.0:1.0, 1.7:1.0, 1.5:1.0, 1.3:1.0, 1.2:1.0, or 1.15:1.0. If the ratio of component (B) to component (A) is substantially higher than these preferred values, the coatings formed are not likely to dislodge themselves readily from the underlying substrate even after having been heated. Also, even if adequate dislodgement does occur, still tacky particles of paint may be redispersed in the water often used to heat the coating according to the invention in order to dislodge it, and these tacky paint particles may redeposit on unprotected surfaces before the surfaces can be recoated with a protective barrier. On the other hand, if the ratio of component (B) to component (A) is substantially lower than the preferred values, the barrier coating formed may dissolve too readily in low temperature water, with which they are usually in contact when in use, thereby requiring uneconomically frequent replacement of the barrier coating.

For component (C), suitable materials are commercially available from Expancel Inc., a subsidiary of Akzo Nobel, in Duluth, Ga., USA under the name EXPANCEL™ unexpanded microballoons. Both wet unexpanded ("WU") and dry unexpanded ("DU") grades are available and appear to be equally useful in a composition according to the invention. Preferably, the average diameter, before expansion by heating, of the microballoons used is not more than, with increasing preference in the order given, 100, 70, 50, 40, 30, 25, or 20 µm and independently preferably is at least, with increasing preference in the order given, 3.0, 4.0, 5.0, 6.0, 7.0, 8.0, 9.0, or 10.0 µm. Smaller microballoons than these preferred minimum sizes may not generate sufficient force upon expansion to rupture the coating as desired, while larger microballoons than the preferred maximum sizes are more difficult to disperse uniformly into coatings of the most desirable thickness. Independently, the amount of component (C) in a working composition according to the invention preferably is at least, with increasing preference in the order given, 1.0, 2.0, 3.0, 3.5, 4.0, or 4.5% and independently preferably is not more than, with increasing preference in the order given, 20, 15, 10, 8.0, 7.0, 6.5, 6.0, 5.5, or 5.1%.

A working liquid substrate coating composition according to this invention preferably is highly thixotropic, i.e., it preferably has a relatively high viscosity when beginning to be disturbed from a motionless state, but becomes relatively low in viscosity when subjected to stronger forces, so that it may readily be applied by convenient methods such as spraying, dipping, brushing, and the like to a substrate to be protected, to form a coating that will remain in place against the influence of natural gravity without becoming thinned to an undesirable degree. The thixotropy may conveniently be measured by means of a well known type of instrument, a Brookfield viscometer, using spindle #4. The viscosity at 25° C. of a liquid working coating compostion according to the invention measured in this way, when measured at 1 revolution per minute (hereinafter abbreviated as "rpm") preferably is at least, with increasing preference in the order given, 3000, 5000, 7000, 9000, 10,000, 11,000, 12,000, 12,500, 13,000, or 13,500 centipoises (hereinafter abbreviated as "cps"); independently preferably is, when measured at 5 rpm, at least, with increasing preference in the order given, 2000, 2250, 2500, 2750, 3000, 3250, 3500, 3750, 4000, 4200, 4400, 4600, 4800, or 4900, cps; and also independently preferably is, when measured at 20 rpm, not more than, with increasing preference in the order given, 6000, 5000, 4000, 3750, 3500, 3250, 3000, 2750, 2500, or 2250 cps.

Achieving the most preferred viscosities as described above normally requires the use of optional component (D) as recited above, because components (A) through (C) do not normally spontaneously form compositions with the most preferred thixotropic properties. A wide variety of natural and synthetic materials, such as natural gums and other polysaccharides and various synthetic polymers, are known in the art for achieving thixotropy and may be used in a composition according to the invention. The most preferred material for component (D) when used is xanthan gum, preferably a type of this gum which has been modified from its natural state to result in smoother flow properties at low shear rates. For any viscosity modifying component, the amount preferably should be selected to achieve preferable values of viscosities at various measuring speeds as already specified above. For the preferred modified xanthan gum as noted above, along with other preferred types and amounts of components (A) through (C), the concentration of the modified xanthan gum in a liquid coating composition according to the invention preferably is at least, with increasing preference in the order given, 0.20, 0.30, 0.40, 0.50, 0.55, or 0.57% and independently preferably is not more than, with increasing preference in the order given, 1.5, 1.0, 0.90, 0.80, 0.70, 0.65, 0.60, or 0.58%.

The presence of optional component (E) in a composition according to the invention is normally preferred, because such presence in a suitable amount has been found to facilitate a desirable fracture and dislodgment of the coating after expansion of component (C). When the filler has a specific gravity of 2.7, the amount of filler in a liquid working coating composition according to the invention preferably is at least, with increasing preference in the order given, 2, 5, 8, 10, 11.0, 12.0, 13.0, 14.0, 14.5, 15.0, or 15.5% of the total amount of components (A) and (B) and independently preferably is not more than, with increasing preference in the order given, 50, 45, 40, 35, 30, 25, 22, 20, 18, 16.8, 16.2, or 15.7% of the total amount of components (A) and (B). If the specific gravity of the filler is different, the preferred values should be adjusted to give the same volume of filler as the preferences stated above for fillers with a specific gravity of 2.7.

Independently of the other preferences, the maximum particle size of the filler when used preferably is not more than, with increasing preference in the order given, 100, 75, 50, 40, 30, 25, 22, 20, 18, or 16 µm and independently the particle size preferably is at least, with increasing preference in the order given, 2, 3, 4, 5, 6, 7, 8, 9, or 10 µm for at least 10%, or more preferably, with increasing preference in the order given, for at least 20, 30, 40, 50, 60, 70, 80, or 90% of the total amount of filler.

The chemical nature of the filler is not believed to be significant to the success of the invention, provided that there is little or no chemical reaction between the filler and other components and that the filler is not soluble to an extent of as much as 1% of its total in water. Any of the conventional insoluble mineral fillers such as talcs, clays, carbonates, and the like is suitable, with talc preferred.

The presence of optional component (F) is also normally preferred, because it has been found difficult uniformly to disperse microballoon component (C) and sometimes also filler component (E) when used into a working liquid coating composition according to the invention when no surfactant dispersing agent is present. Any of a wide variety of dispersing agents generally known in the art is suitable if it leads to effective dispersion and stability of the resulting final working coating composition. A preferred type of dispersing agent is one having general chemical formula (I):

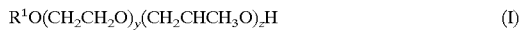
$$R^1O(CH_2CH_2O)_y(CH_2CHCH_3O)_zH \qquad (I)$$

where $R^1$ is a moiety selected from the group consisting of saturated-and-unsaturated straight-and-branched-chain-aliphatic-monovalent-hydrocarbon-moiety-substituent-bearing phenyl moieties in which the aromatic ring is directly bonded to the oxygen atom appearing immediately after the $R^1$ symbol in formula (II); y is a positive integer, and z is zero, one, or two. Preferably, independently for each preference stated, z is 1 or 0, more preferably zero; the aliphatic monovalent hydrocarbon moiety substituent in $R^1$ has at least, with increasing preference in the order given, 5, 6, 7, 8, or 9 carbon atoms and independently preferably has not more than, with increasing preference in the order given, 12, 11, 10, or 9 carbon atoms; the aliphatic monovalent hydrocarbon moiety substituent in $R^1$ is straight chain rather than branched; and the average value of y is at least, with increasing preference in the order given, 3, 4, 5, 6, 7, or 8 and independently preferably is not more than, with increasing preference in the order given, 16, 15, 14, 13, 12, 11, 10, or 9.

The pH value of a liquid working coating composition according to the invention, at least when the substrate metal to be coated is mild steel, preferably is at least, with increasing preference in the order given, 5.0, 6.0, 6.5, 7.0, 7.5, 8.0, 8.3, or 8.6 and independently preferably is not more than, with increasing preference in the order given, 12, 11, 10, or 9.5. Lower pH values than those noted as preferable minimums may result in excessive corrosion of the substrate, or even failure to form a coating at all, while higher pH values than those noted as preferred maximums may adversely affect the properties of the other constituents of a working coating composition according to the invention. Inasmuch as components (A) through (F) alone would often result in pH values below those preferred, an alkaline pH adjusting agent is generally preferably present as optional component (G) in a liquid coating composition according to the invention. Because they have an inherent corrosion inhibiting effect in addition to their pH raising effect, water soluble organic amines are preferred for component (G) when an increase in pH is needed, and, primarily in order to minimize odor nuisances, relatively non-volatile amines such as mono-, di-, and, particularly, tri-ethanol amines are especially preferred. Should a decrease in pH be needed, many suitable acid materials to serve as pH adjusting agents are known to those skilled in the art.

Optional colorant component (H) is not believed to have any important technical function in the operation of the invention, but may be desirable in many applications for decorative or visibility-increasing purposes. Numerous conventional dyes and/or pigments may be used for component (H) as known to those skilled in the art.

Optional biocidal component (J) normally is preferably present in a liquid composition according to the invention in an amount effective to repress the biodegradation of some of the components of the composition, especially component (A), that otherwise readily occurs from the action of microorganisms commonly found in the natural atmosphere.

The liquid coating initially formed may be adquately dried by mere exposure to normal ambient air at a humidity less than 100%. However, because several hours may be required for drying by this method, it is normally preferred to utilize hot air for drying. More particularly, air used to dry the liquid coating initially formed preferably has a temperature that is at least, with increasing preference in the order given, 38, 43, 48, 53, 57, or 60° C. and independently preferably is not more than, with increasing preference in the order given, 75, 72, 69, or 67° C.; higher temperatures than these will substantially increase the risk of unwanted premature irreversible expansion of the microballoons in the coating, and achieve only slightly greater drying speeds, as shown in some of the working examples below.

In order to achieve the most desired characteristics, a dried but unexpanded protective coating according to the invention preferably has a thickness that is at least, with increasing preference in the order given, 12, 15, 18, 21, 24, 27, or 30 μm and independently preferably is, primarily for reasons of economy, not more than 100, 75, 65, 55, 45, or 35 μm. Also, of course, when used on grates, coatings according to the invention normally should not be so thick as to make the grates impermeable to fluids.

When a dried coating according to the invention has accumulated a sufficient amount of paint on its surface, the coating is preferably caused to break apart and dislodge itself from the substrate by immersion in hot water, although spraying of hot water and/or steam, hot air, or other methods of heating can also be used. Hot water is preferred when practical, because heat transfer from it to the coating is relatively efficient and dislodgement and separation are facilitated by the fact that the coating, at least if it is one of the most preferred embodiments, will float on water after the irreversible expansion of the microballoons occurs, but not before. In particular, hot water with a temperature that preferably is at least, with increasing preference in the order given, 80, 82, 84, 86, 88, 90, or 92° C. is used. Although the use of still higher temperature water has no adverse effect on the break up and dislodgement of the coating, it does not provide much if any practically higher break up and dislodgement speed and does require a higher energy cost. Therefore, when hot water is used for this purpose, its temperature independently preferably is not more than, with increasing preference in the order given, 98, 96, or 94° C. If steam, air, or another purely gaseous heat transfer medium is used, substantially higher temperatures than these for the heat transfer medium are preferred to compensate for the relatively slow heat transport capacity of a gas.

Highly preferred coatings according to the invention break apart within a few minutes when immersed in hot water at a preferred temperature and float to the top of the vessel in which they are immersed, thereby making possible a facile separation by skimming off the broken particles formed. Any tacky paint that may separate during the breakup and dislodgement process normally is detackified by residual components (A) and (B) of the coating. Component (A) has the major detackifying effect, but component (B) also aids in detackification by forming water-insoluble particles that stick to tacky paint surfaces and thereby reduce the effectively tacky area of any originally tacky surface. As a consequence of the combined action of these two components, the skimmed particles of the coating do not stick readily to any other surfaces with which they may come into contact. Therefore, after broken up particles of the coating have been skimmed off the surface of hot water in which a coated substrate according to the invention was immersed to break up the coating, the substrate may normally be removed from the hot water, dried, and then recoated with a coating composition according to the invention for continued use, and such coating and dislodgement cycles may be continued as many times as desired on the same substrate.

The invention may be further appreciated by consideration of the following examples, and its benefits may be appreciated by comparison with other methods.

EXAMPLES

Materials Used

CYANAMER™ N-100L polyacrylamide solution in water, reported by its supplier to contain 50–52% of polyacrylamide, was obtained commercially from Cytek Industries.

FLEXBOND™325 latex dispersion of a copolymer of vinyl acetate and acrylate, reported by its supplier to contain 55.8% solids of a polymer with a glass transition temperature of 15° C. dispersed in water, was obtained commercially from Air Products and Chemicals.

EXPANCEL™642 WU and 820 DU grades of gas filled microballoons were obtained commercially from Expancel Inc. as noted above. Grade 642 WU is reported by its supplier to contain 65% of microballoons with diameters ranging from 3 to 30 $\mu$m, with the balance of the material being water in which the microballoons are dispersed; grade 820 DU is reported by its supplier to be 100% microballoons with diameters ranging from 10 to 16 $\mu$m. For both grades, the filling gas is reported to be iso-butane and the polymer walls to be made of acrylonitrile-vinylidene chloride copolymer.

KELZAN™ AR xanthan gum powder was commercially obtained from the Kelco division of Merck & Co., Inc. and is reported by its supplier to contain 86–92% solids of xanthan gum (which is constituted of polymers of β-1,4-linked D-glucose units) that has been modifed to give lower viscosity at low shear rates than unmodified natural xanthan gum. For example, a solution of 0.3% of each of potassium chloride and KELZAN™ AR in water has a viscosity of about 800 cps at a shear rate of 0.1 reciprocal seconds (hereinafter usually abbreviated as "$sec^{-1}$"), whereas an otherwise identical solution of natural xanthan gum has a viscosity of almost 10,000 cps. At a shear rate of 10 $sec^{-1}$, the viscosities of these solutions are about 100 and 500 cps respectively. K8C241™ unmodified xanthan gum was also obtained commercially from Kelco.

NATROSOL™250H4R hydroxyethylcellulose was obtained commercially from Aqualon, a division of Hercules, Inc., in Wilmington, Dela., U.S.A. and is reported by its supplier to have a molecular weight, estimated from intrinsic viscosity measurements, of $1.1 \times 10^6$; a solution of 1% of it in water is reported by its supplier to have a viscosity of 2600–3300 cps at 25° C. when measured with a Brookfield viscometer using spindle #3 at 30 rpm.

MICROTALC™ MP 15-38 filler was commercially obtained from Marietta Minerals, Dillon, Mont. and is reported by its supplier to be a mined magnesium silicate mineral with a maximum particle size of 15 $\mu$m and the chemical formula $Mg_3H_2(SiO_3)_4$.

IGEPAL™ CO-630 surfactant was obtained commercially from Rhône-Poulenc and is reported by its supplier to be nonylphenol[poly(oxyethylene)]ethanol with an average molecular weight of 616.

BUTOXYNE™ 497 corrosion inhibitor was obtained commercially from ISP Technologies, Inc., Wayne, N.J., USA and is reported by its supplier to be 1,4-bis(2-hydroxyethoxy)-2-butyne.

HOSTACOR™2732 inhibitor was obtained commercially from Hoechst Celanese Corp. and is reported by its supplier to be "alkylamido carboxylic acid".

Triethanol amine, 99% pure, was used as a pH adjusting agent and corrosion inhibitor.

DOWICIDE™ A Flake antimicrobial was obtained commercially from Van Waters and Rogers, Kirkland, Wash., USA and is reported by its supplier to contain 97% of sodium orthopheynylphenate tetrahydrate and 1–2% of sodium hydroxide.

UNISPERSE™ Blue pigment was obtained commercially from Ciba-Geigy as a paste.

CELOGEN™ 780 was obtained commercially from Uniroyal Chemicals and is reported by its supplier to be "activated" azodicarbonamide. This is a conventional blowing agent.

Working Coating Compositions

Example working compositions according to the invention are set forth in Table 1 below. Blank cells in the table indicate that none of the material was added to the composition, or that the property value that would properly appear in the cell was not measured. (Only the first three digits of the viscosity measurements are considered significant within the limits of reproducibility of the measurements; the final zeros are shown merely for the sake of reporting in the most conventional units.)

TABLE 1

| Material | % of Material in Composition Number | | | | | | |
|---|---|---|---|---|---|---|---|
| | 1 | 2 | 3 | 4 | 5 | 6 | 7 |
| Deionized Water | 72 | 74 | 74 | 74.2 | 69.2 | 70.2 | 70.0 |
| DOWICIDE ™ A Flake | 0.10 | 0.10 | 0.10 | | 0.10 | | 0.10 |
| KELZAN ™ AR | 0.6 | 0.6 | 0.7 | 0.65 | 0.65 | 0.65 | 0.80 |
| NATROSOL ™ 250H4R | | | | | | | |
| K8C241 ™ | | | | | | | |
| CYANAMER ™ N-100L | 10.0 | 10.0 | 10.0 | 10.0 | 10.0 | 10.0 | 10.0 |
| FLEXBOND ™ 325 | 10.0 | 10.0 | 10.0 | 10.0 | 10.0 | 10.0 | 10.0 |
| IGEPAL ™ CO-630 | 1.00 | 1.00 | 1.00 | 1.00 | 1.00 | 1.00 | 1.00 |
| MICROTALC ™ MP 15-38 | | | | | | | |
| CELOGEN ™ 780 | | | | | 2.00 | 2.00 | |
| EXPANCEL ™ 642 WU | 6.00 | | 6.00 | | 5.00 | | 6.00 |
| EXPANCEL ™ 820 DU | | 4.00 | | 4.00 | | 4.00 | |
| HOSTACOR ™ 2732 | | | | | 2.00 | | |
| BUTOXYNE ™ 497 | | | | | | 2.00 | |
| 99% Triethanolamine | | | 2.00 | 2.00 | | | 2.00 |
| UNISPERSE ™ Blue | 0.10 | 0.10 | 0.10 | 0.01 | 0.10 | 0.10 | 0.10 |

TABLE 1-continued

| Other Properties of the | Magnitude of the Property in Composition Number: | | | | | | |
|---|---|---|---|---|---|---|---|
| Compositions | 1 | 2 | 3 | 4 | 5 | 6 | 7 |
| Viscosity[1] at 20 rpm, cps | 1770 | 1770 | 1720 | 1710 | 1920 | 1880 | 2680 |
| Viscosity[1] at 5 rpm, cps | | | 4000 | 3720 | | | 7040 |
| Viscosity[1] at 1 rpm, cps | | | 12,400 | 10,200 | | | 22,400 |
| pH | 5.1 | 5.0 | 9.0 | 9.1 | 5.6 | 5.6 | 9.0 |

| | % of Material in Composition Number | | | | | | |
|---|---|---|---|---|---|---|---|
| Material | 8 | 9 | 10 | 11 | 12 | 13 | 14 |
| Deionized Water | 72.0 | 64.5 | 66.5 | 62.6 | 67.6 | 62.5 | 64.5 |
| DOWICIDE ™ A Flake | 0.10 | 0.10 | 0.10 | 0.10 | 0.10 | 0.10 | 0.10 |
| KELZAN ™ AR | 0.80 | 0.80 | 0.80 | 0.75 | 0.75 | | |
| NATROSOL ™ 250H4R | | | | | | 0.50 | 0.50 |
| K8C241 ™ | | | | | | 0.30 | 0.30 |
| CYANAMER ™ N-100L | 10.0 | 12.0 | 12.0 | 12.0 | 12.0 | 12.0 | 12.0 |
| FLEXBOND ™ 325 | 10.0 | 12.0 | 12.0 | 12.0 | 12.0 | 12.0 | 12.0 |
| IGEPAL ™ CO-630 | 1.00 | 0.50 | 0.50 | 0.50 | 0.50 | 0.50 | 0.50 |
| MICROTALC ™ MP 15-38 | | | | 2.00 | 2.00 | 2.00 | 2.00 |
| CELOGEN ™ 780 | | | | | | | |
| EXPANCEL ™ 642 WU | | 7.00 | | 7.00 | | 7.00 | |
| EXPANCEL ™ 820 DU | 4.00 | | 5.00 | | 5.00 | | 5.00 |
| HOSTACOR ™ 2732 | | | | | | | |
| BUTOXYNE ™ 497 | | | | | | | |
| 99% Triethanolamine | 2.00 | 3.00 | 3.00 | 3.00 | | 3.00 | 3.00 |
| UNISPERSE ™ Blue | 0.10 | 0.10 | 0.10 | 0.10 | 0.10 | 0.10 | 0.10 |

| Other Properties of the | Magnitude of the Property in Composition Number: | | | | | | |
|---|---|---|---|---|---|---|---|
| Compositions | 8 | 9 | 10 | 11 | 12 | 13 | 14 |
| Viscosity[1] at 20 rpm, cps | 2400 | 2740 | 2800 | 3030 | 2530 | 4400 | 4370 |
| Viscosity[1] at 5 rpm, cps | 6160 | 7480 | 7920 | 9240 | 6880 | 11,600 | 12,000 |
| Viscosity[1] at 1 rpm, cps | 19,000 | 23,800 | 25,600 | 30,800 | 21,200 | 29,000 | 30,600 |
| pH | 9.0 | 9.0 | 9.0 | 8.8 | 9.1 | 9.1 | 9.1 |

| | % of Material in Composition Number: | | | | | |
|---|---|---|---|---|---|---|
| Material | 15 | 16 | 17 | 18 | 19 | 20 |
| Deionized Water | 64.6 | 66.6 | 627 | 64.7 | 62.6 | 64.7 |
| DOWICIDE ™ A Flake | 0.10 | 0.10 | 0.10 | 0.10 | 0.10 | 0.10 |
| KELZAN ™ AR | 0.65 | 0.65 | 0.60 | 0.60 | 0.65 | 0.65 |
| NATROSOL ™ 250R4R | | | | | | |
| K8C241 ™ | | | | | | |
| CYANAMER ™ N-100L | 12.0 | 12.0 | 12.0 | 12.0 | 12.0 | 12.0 |
| FLEXBOND ™ 325 | 12.0 | 12.0 | 12.0 | 12.0 | 12.0 | 12.0 |
| IGEPAL ™ CO-630 | 0.50 | 0.50 | 0.50 | 0.50 | 0.50 | 0.50 |
| MICROTALC ™ MP 15-38 | | | 2.00 | 2.00 | 2.00 | 2.00 |
| CELOGEN ™ 780 | | | | | | |
| EXPANCEL ™ 642 WU | 7.00 | | 7.00 | | 7.00 | |
| EXPANCEL ™ 820 DU | | 5.00 | | 5.00 | | 5.00 |
| HOSTACOR ™ 2732 | | | | | | |
| BUTOXYNE ™ 497 | | | | | | |
| 99% Triethanolamine | 3.00 | 3.00 | 3.00 | 3.00 | 3.00 | 3.00 |
| UNISPERSE ™ Blue | 0.10 | 0.10 | 0.10 | 0.10 | 0.10 | 0.10 |

| Other Properties of the | Magnitude of the Property in Composition Number: | | | | | |
|---|---|---|---|---|---|---|
| Compositions | 15 | 16 | 17 | 18 | 19 | 20 |
| Viscosity[1] at 20 rpm, cps | 2000 | 1840 | 1790 | 1770 | 2010 | 1900 |
| Viscosity[1] at 5 rpm, cps | 5360 | 4240 | 4520 | 4400 | 5600 | 4920 |
| Viscosity[1] at 1 rpm, cps | | 9200 | 10,400 | 9200 | 15,400 | 13,600 |
| pH | 9.2 | 9.2 | 9.2 | 9.1 | 9.1 | 9.1 |

[1]The viscosity was measured at 25° C. with a Brookfield Viscometer, using Spindle #4.

Use Examples

Each working composition defined in Table 1 was coated over a sample of conventional grate plate material for spray paint booths to produce a coating with a wet thickness of about 0.20 millimeters. The coating was then dried at a temperature of 60° C. for a time of 20 minutes to produce a dry coating according to the invention. Various kinds of paint were caused to accumulate on the thus coated samples, by exposing them to a laboratory scale paint spray booth, until the coating of paint in its thickest parts was about 0.51 millimeters thick. The coated samples were then immersed in water at a temperature of 93° C. Within 30 seconds, breakup and dislodgement of the coating could be observed, and this process was completed within 90 seconds. The particles formed by breakup of the protective coating according to the invention and the paint adhered to it were skimmed off the top of the water in which the breakup of the coating had occurred. The vessel was then emptied and the previously coated metal substrate samples removed. No adherent paint on either the previously coated metal substrate samples or the walls of the vessel in which breakup of the coatings had occurred was observed.

Time and Temperature Variations for Drying Wet Coatings According to the Invention In this group of examples, numerous coated samples of conventional grate material were prepared with a wet coating thickness of about 0.20 millimeters of Composition No. 20 as shown in Table 1 and subjected to drying conditions as shown in Table 2 below, with the results also shown in Table 2. At the same time as the coated substrates were being exposed to drying conditions as reported in Table 2, a small aluminum pan with a thin layer of the coating composition was exposed to the same drying conditions. Any visually perceptible roughening of the layer of coating, bubbles in the layer, irregularities in thickness, or the like was regarded as evidence of the beginning of irreversible expansion of the microballoons, which of course is not desired at this stage of a process according to the invention.

TABLE 2

| Temperature, °C. | Time of Exposure to Temperature, Minutes: | | | | | | |
|---|---|---|---|---|---|---|---|
| | 10 | 20 | 30 | 40 | 50 | 60 | 70 |
| 21 | VW | VW | W | W | W | W ex. E. | W ex. E. |
| 32 | VW | W | W ex. E. | D ex Dr. | CD | CD | CD |
| 43 | W ex. E. | 90% D | CD | CD | CD | CD | CD |
| 54 | 90% W | 90% D | CD | CD | CD | CD | CD |
| 66 | 75% W | CD | CD | CD | CD | CD | CD |
| 77 | 80% D | CD* | CD* | CD* | CD* | CD* | CD* |
| 88 | CD* | CD* | CD* | CD** | CD** | CD** | CD** |

Abbreviations and Notes for Table 2
VW = very wet; W = wet; ex. E. = except at edges; D = dry; ex. Dr. = except for a few wet drops; CD = completely dry; percentages are estimated area percents;
*indicates that there was visual evidence of at least the beginning of expansion of the microballoons in the pan sample of the coating composition, but not in the coating on the grate samples;
**indicates that there was visual evidence of at least the beginning of expansion of microballoons in both the pan sample and the coating on the grate substrates; at 21° C., which was the ambient temperature in the laboratory at the time of the tests, the relative humidity was 65%; at other temperatures, the relative humidity was whatever resulted from heating air at the ambient temperature and humidity to the temperatures shown, without any added water.

The invention claimed is:

1. A liquid coating composition suitable for applying to a solid surface for producing a thermally releasable barrier coating on the surface, said liquid coating composition comprising water and:
   (A) a component of water soluble polymer material that (i) is solid at 25° C., (ii) contains at least 1 percent of nitrogen atoms bonded into a chemical moiety selected from the group consisting of amido and quaternary ammonium, and (iii) is soluble in water to an extent of at least 5% by weight at 25° C. and normal atmospheric pressure;
   (B) a component of film forming polymer that is soluble in water to an extent of not more than 4.5% by weight at 25° C. and normal atmospheric pressure but is stably dispersed in the coating composition; and;
   (C) a component of gas filled, polymer walled microballoons having the properties that (i) they are stably dispersed in the coating composition and remain stably dispersed and not irreversibly expanded when the coating composition is maintained at a temperature not greater than 65° C.; and (ii) when exposed for at least five minutes to at least one temperature in the range from 80 to 95° C., they undergo an irreversible expansion, without wall rupture, so as to produce an expanded form which has a density not greater than 0.5 times their density before having expanded, said liquid coating composition having the property that it can be formed into a liquid coating over a metal or plastic substrate solid surface and the thus-formed liquid coating can be converted, by heating the liquid film in place on the substrate to a temperature not greater than 65° C. under normal atmospheric pressure for a time not greater than one hour, into a coherent solid coating that adheres to the substrate.

2. A composition according to claim 1, wherein, with all percentages based on the total composition unless otherwise stated: component (A) is present in an amount from about 1.0 to about 30% by weight; component (B) is present in an amount from about 1.0 to about 30% by weight; components (B) and (A) are jointly present in amounts having a ratio by weight of component (B) to component (A) that is from about 0.30:1.0 to about 4.0:1.0; the microballoons of component (C) have an average diameter between about 3 and about 100 μm; the amount of component (C) is from about 1.0 to about 20% by weight; and the composition has a viscosity that is at least 3000 cps when measured at 1 rpm, at least 2000 when measured at 5 rpm, and not more than 6000 when measured at 20 rpm, said viscosity being measured at a temperature of 25° C. by a Brookfield viscometer, using Spindle #4.

3. A composition according to claim 2, wherein: the amount of component (A) is from about 2.0 to about 25% by weight; the amount of component (B) is from about 2.0 to about 25% by weight; the ratio by weight of component (B) to component (A) is from about 0.40:1.0 to about 3.5:1.0; the microballoons of component (C) have an average diameter between about 4 and about 70 μm; the amount of component (C) is from about 2.0 to about 15% by weight; the viscosity of the composition is at least 4000 cps when measured at 1 rpm, at least 2250 when measured at 5 rpm, and not more than 5000 when measured at 20 rpm; and the composition additionally comprises a component (E) that is present in a volume that corresponds in mass to from about 5 to about 50% by weight of the total of components (A) and (B) for a solid with a specific gravity of 2.7, said component (E) consisting of solid mineral filler that is insoluble in water or has a solubility in water that is not more than 1% by weight.

4. A composition according to claim 3, wherein: component (A) consists of polymers of amides of unsaturated carboxylic acids; the amount of component (A) is from about 3.0 to about 20% by weight; component (B) consists of copolymers of (i) vinyl esters of carboxylic acids with not more than four carbon atoms per molecule and (ii) at least one of acrylic and methacrylic acids and esters of both these acids; the amount of component (B) is from about 3.0 to about 20% by weight; the ratio by weight of component (B) to component (A) is from about 0.50:1.0 to about 3.0:1.0; the microballoons of component (C) have an average diameter between about 5 and about 50 µm; the amount of component (C) is from about 3.0 to about 10% by weight; the viscosity of the composition is at least about 7000 cps when measured at 1 rpm, at least about 2500 cps when measured at 5 rpm, and not more than about 4000 cps when measured at 20 rpm; component (E) is present in a volume that corresponds in mass to from about 8 to 45% by weight of the total of components (A) and (B) for a solid with a specific gravity of 2.7; and at least 40% by weight of the total amount of component (E) is made up of particles with a size between 4 and 50 µm.

5. A composition according to claim 4, wherein: the amount of component (A) is from about 3.5 to about 15% by weight; the amount of component (B) is from about 3.5 to about 15% by weight; the ratio by weight of component (B) to component (A) is from about 0.60:1.0 to about 2.5:1.0; the microballoons of component (C) have an average diameter between about 6 and about 40 µm; the amount of component (C) is from about 3.5 to about 8.0% by weight; the viscosity of the composition is at least about 9000 cps when measured at 1 rpm, at least about 2750 cps when measured at 5 rpm, and not more than about 3750 cps when measured at 20 rpm; component (E) is present in a volume that corresponds in mass to from 10 to 40% by weight of the total of components (A) and (B) for a solid with a specific gravity of 2.7; and at least 50% by weight of the total amount of component (E) is made up of particles with a size between 5 and 40 µm.

6. A composition according to claim 5, wherein: the amount of component (A) is from about 4.0 to about 10% by weight; the amount of component (B) is from about 4.0 to about 10% by weight; the ratio by weight of component (B) to component (A) is from about 0.70:1.0 to about 2.0:1.0; the microballoons of component (C) have an average diameter between about 7 and about 30 µm; the amount of component (C) is from about 4.0 to about 7.0% by weight; the viscosity of the composition is at least about 10,000 cps when measured at 1 rpm, at least about 3000 cps when measured at 5 rpm, and not more than about 3500 cps when measured at 20 rpm; component (E) is present in a volume that corresponds in mass to from 11.0 to 35% by weight of the total of components (A) and (B) for a solid with a specific gravity of 2.7; and at least 50% by weight of the total amount of component (E) is made up of particles with a size between 5 and 40 µm.

7. A composition according to claim 6, wherein: the amount of component (A) is from about 4.5 to about 9.0% by weight; the amount of component (B) is from about 4.5 to about 9.0% by weight; the ratio by weight of component (B) to component (A) is from about 0.80:1.0 to about 1.7:1.0; the microballoons of component (C) have an average diameter between about 8.0 and about 25 µm; the amount of component (C) is from about 4.0 to about 6.5% by weight; the viscosity of the composition is at least about 10,000 cps when measured at 1 rpm, at least about 3250 cps when measured at 5 rpm, and not more than about 3250 cps when measured at 20 rpm; component (E) is selected from the group consisting of water-insoluble mineral talcs, clays, and carbonates and is present in a volume that corresponds in mass to from 12.0 to 30% by weight of the total of components (A) and (B) for a solid with a specific gravity of 2.7; and at least 60% by weight of the total amount of component (E) is made up of particles with a size between 6 and 30 µm.

8. A composition according to claim 7, wherein: the amount of component (A) is from about 4.8 to about 8.5% by weight; the amount of component (B) is from about 4.9 to about 8.5% by weight; the ratio by weight of component (B) to component (A) is from about 0.90:1.0 to about 1.3:1.0; the microballoons of component (C) have an average diameter between about 9.0 and about 22 µm; the amount of component (C) is from about 4.0 to about 6.0% by weight; the viscosity of the composition is at least about 11,000 cps when measured at 1 rpm, at least about 3500 cps when measured at 5 rpm, and not more than about 3100 cps when measured at 20 rpm; component (E) is present in a volume that corresponds in mass to from about 13.0 to about 25% by weight of the total of components (A) and (B) for a solid with a specific gravity of 2.7; and at least 70% by weight of the total amount of component (E) is made up of particles with a size between 7 and 25 µm.

9. A composition according to claim 8, wherein: the amount of component (A) is from about 5.2 to about 8.0% by weight; the amount of component (B) is from about 5.3 to about 7.5% by weight; the ratio by weight of component (B) to component (A) is from about 0.95:1.0 to about 1.3:1.0; the microballoons of component (C) have an average diameter between about 9.0 and about 20 µm; the amount of component (C) is from about 4.0 to about 5.5% by weight; the viscosity of the composition is at least about 12,000 cps when measured at 1 rpm, at least about 4000 cps when measured at 5 rpm, and not more than about 3100 cps when measured at 20 rpm; component (E) is present in a volume that corresponds in mass to from about 14.0 to about 22% by weight of the total of components (A) and (B) for a solid with a specific gravity of 2.7; and at least 80% by weight of the total amount of component (E) is made up of particles with a size between 8.0 and 20 µm.

10. A composition according to claim 8, wherein: component (A) consists of polymers of acrylamide; the amount of component (A) is from about 5.8 to about 6.2% by weight; component (B) consists of copolymers of (i) vinyl acetate and (ii) at least one of esters of acrylic and methacrylic acids with alcohols containing not more than four carbon atoms; the amount of component (B) is from about 6.3 to about 6.9% by weight; the ratio by weight of component (B) to component (A) is from about 1.05:1.0 to about 1.2:1.0; the microballoons of component (C) have an average diameter between about 10 and about 20 µm; the amount of component (C) is from about 4.5 to about 5.1% by weight; the viscosity of the composition at 25° C. is at least about 13,500 cps when measured at 1 rpm, at least about 4900 cps when measured at 5 rpm, and not more than about 3100 cps when measured at 20 rpm; component (E) is talc with a specific gravity of 2.7 and is present in an amount from about 15.0 to about 16.2% by weight of the total of components (A) and (B); and at least 90% by weight of the total amount of component (E) is made up of particles with a size between 10.0 and 16 μm.

11. A process comprising steps of:
(I) forming on a substrate surface to be protected against accumulation of paint thereon a liquid coating of a coating composition according to claim 10, said liquid coating having a thickness corresponding to from about 30 to about 35 μm of constituents of the liquid coating composition that remain present after the liquid coating is heated to 65° C. for at least one hour; and
(II) drying the liquid coating formed in step (I), while said coating is in place over the substrate surface as formed in step (I), by heating the liquid coating for a time from about 19 to about 21 minutes at a temperature from about 59 to about 61° C., to convert the liquid coating to a solid adherent coating over those portions of the substrate surface that were provided with a liquid coating in step (I), without causing irreversible expansion of the gas filled, polymer walled microballoons present in the solid coating.

12. A process comprising steps of:
(I) forming on a substrate surface to be protected against accumulation of paint thereon a liquid coating of a coating composition according to claim 9, said liquid coating having a thickness corresponding to from about 25 to about 40 μm of constituents of the liquid coating composition that remain present after the liquid coating is heated to 65° C. for at least one hour; and
(II) drying the liquid coating formed in step (I), while said coating is in place over the substrate surface as formed in step (I), by heating the liquid coating for a time from about 15 to about 25 minutes at a temperature from about 55 to about 65° C., to convert the liquid coating to a solid adherent coating over those portions of the substrate surface that were provided with a liquid coating in step (I), without causing irreversible expansion of the gas filled, polymer walled microballoons present in the solid coating.

13. A process comprising steps of:
(I) forming on a substrate surface to be protected against accumulation of paint thereon a liquid coating of a coating composition according to claim 8, said liquid coating having a thickness corresponding to at least about 20 μm of constituents of the liquid coating composition that remain present after the liquid coating is heated to 65° C. for at least one hour; and
(II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

14. A process comprising steps of:
(I) forming on a substrate surface to be protected against accumulation of paint thereon a liquid coating of a coating composition according to claim 7, said liquid coating having a thickness corresponding to at least about 20 μm of constituents of the liquid coating composition that remain present after the liquid coating is heated to 65° C. for at least one hour; and
(II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

15. A process comprising steps of:
(I) forming on a substrate surface to be protected against accumulation of paint thereon a liquid coating of a coating composition according to claim 6, said liquid coating having a thickness corresponding to at least about 12 μm of constituents of the liquid coating composition that remain present after the liquid coating is heated to 65° C. for at least one hour; and
(II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

16. A process comprising steps of:
(I) forming on a substrate surface to be protected against accumulation of paint thereon a liquid coating of a coating composition according to claim 5, said liquid coating having a thickness corresponding to at least about 12 μm of constituents of the liquid coating composition that remain present after the liquid coating is heated to 65° C. for at least one hour; and
(II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

17. A process comprising steps of:
(I) forming on a substrate surface to be protected against accumulation of paint thereon a liquid coating of a coating composition according to claim 4, said liquid coating having a thickness corresponding to at least about 12 μm of constituents of the liquid coating composition that remain present after the liquid coating is heated to 65° C. for at least one hour; and
(II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

18. A process comprising steps of:
(I) forming on a substrate surface to be protected against accumulation of paint thereon a liquid coating of a coating composition according to claim 3, said liquid coating having a thickness corresponding to at least about 12 μm of constituents of the liquid coating composition that remain present after the liquid coating is heated to 65° C. for at least one hour; and
(II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

19. A process comprising steps of:

(I) forming on a substrate surface to be protected against accumulation of paint thereon a liquid coating of a coating composition according to claim 2, said liquid coating having a thickness corresponding to at least about 12 μm of constituents of the liquid coating composition that remain present after the liquid coating is heated to 65° C. for at least one hour; and (II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

20. A process comprising steps of:

(I) forming on a substrate surface to be protected against accumulation of paint thereon a liquid coating of a coating composition according to claim 1, said liquid coating having a thickness corresponding to at least about 12 μm of constituents of the liquid coating composition that remain present after the liquid coating is heated to 65° C. for at least one hour; and (II) drying the liquid coating formed in step (I), while said coating is in place over the substrate surface as formed in step (I), for a sufficient time at a sufficient temperature to convert the liquid coating to a solid adherent coating over those portions of the substrate surface that were provided with a liquid coating in step (I), without causing irreversible expansion of the gas filled, polymer walled microballoons present in the solid coating.

* * * * *